(12) United States Patent
Furukawa et al.

(10) Patent No.: US 11,783,983 B2
(45) Date of Patent: Oct. 10, 2023

(54) LAMINATED SHEET

(71) Applicant: NITTO DENKO CORPORATION, Osaka (JP)

(72) Inventors: Yoshihiro Furukawa, Osaka (JP); Keisuke Okumura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 103 days.

(21) Appl. No.: 17/174,988

(22) Filed: Feb. 12, 2021

(65) Prior Publication Data

US 2021/0252840 A1    Aug. 19, 2021

(30) Foreign Application Priority Data

Feb. 17, 2020 (JP) .................................. 2020-024311

(51) Int. Cl.
*H01F 17/04* (2006.01)
*H01F 1/26* (2006.01)
(Continued)

(52) U.S. Cl.
CPC ............... *H01F 17/04* (2013.01); *B32B 3/30* (2013.01); *B32B 7/025* (2019.01); *H01F 1/26* (2013.01); *H01F 27/255* (2013.01); *B32B 5/16* (2013.01); *B32B 2264/10* (2013.01); *B32B 2264/12* (2013.01); *B32B 2307/208* (2013.01); *B32B 2457/00* (2013.01); *H01F 2017/048* (2013.01); *Y10T 428/32* (2015.01)

(58) Field of Classification Search
None
See application file for complete search history.

(56) References Cited

U.S. PATENT DOCUMENTS

2009/0002117 A1\* 1/2009 Kawarai ............ H01F 17/0006
336/233
2011/0175013 A1\* 7/2011 Takahashi ................. H01F 1/24
264/109
(Continued)

FOREIGN PATENT DOCUMENTS

EP    2963094 A1 \* 1/2016 ............ B32B 27/08
EP    2963094 A1    1/2016
(Continued)

*Primary Examiner* — Kevin M Bernatz
(74) *Attorney, Agent, or Firm* — Edwards Neils LLC; Jean C. Edwards, Esq.

(57) ABSTRACT

A laminated sheet includes a sheet-shaped inductor including a plurality of wirings and a magnetic layer embedding the plurality of wirings, and a processing stability layer disposed on at least one surface 6 in a thickness direction of the inductor. The magnetic layer includes a binder and a magnetic particle having a generally flat shape and whose material is a metal. The processing stability layer includes a cured product of a thermosetting resin composition. The thermosetting resin composition includes a thermosetting resin as an essential component. The thermosetting resin composition includes at least one kind of particle, as an optical component, selected from the group consisting of a first particle having a generally spherical shape and a second particle having a generally flat shape and whose material is an inorganic compound.

9 Claims, 8 Drawing Sheets

(51) Int. Cl.
*H01F 27/255* (2006.01)
*B32B 3/30* (2006.01)
*B32B 7/025* (2019.01)
*B32B 5/16* (2006.01)

(56) References Cited

U.S. PATENT DOCUMENTS

| | | | |
|---|---|---|---|
| 2012/0105188 A1* | 5/2012 | Lim | H01F 27/245 336/200 |
| 2013/0228716 A1* | 9/2013 | Suetsuna | H01F 1/01 427/127 |
| 2016/0083626 A1 | 3/2016 | Ebe et al. | |
| 2017/0309388 A1* | 10/2017 | Park | H01F 41/0233 |
| 2019/0115150 A1* | 4/2019 | Yoshioka | H01F 17/04 |
| 2019/0189338 A1* | 6/2019 | Kim | H01F 27/2828 |
| 2019/0392978 A1* | 12/2019 | Matsuura | H01F 1/26 |
| 2020/0143967 A1* | 5/2020 | Maede | H01F 1/20 |
| 2020/0365315 A1* | 11/2020 | Kim | H01F 27/292 |
| 2021/0027945 A1* | 1/2021 | Takahashi | H01G 4/2325 |
| 2021/0036095 A1* | 2/2021 | Pulugurtha | H01F 1/26 |
| 2021/0098185 A1* | 4/2021 | Gibu | H01F 17/04 |
| 2021/0257148 A1* | 8/2021 | Furukawa | H01F 17/04 |
| 2021/0343468 A1* | 11/2021 | Yoshioka | H01F 27/324 |

FOREIGN PATENT DOCUMENTS

| | | | |
|---|---|---|---|
| JP | 2014-165363 A | 9/2014 | |
| JP | 2014-189015 A | 10/2014 | |
| JP | 2019-220618 A | 12/2019 | |

* cited by examiner

FIG. 1
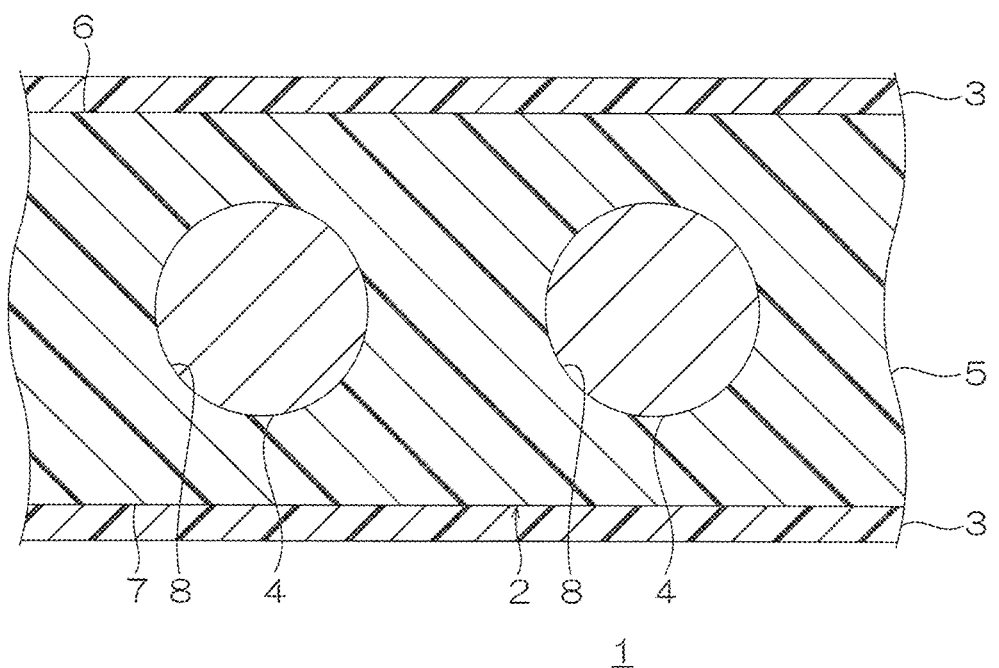
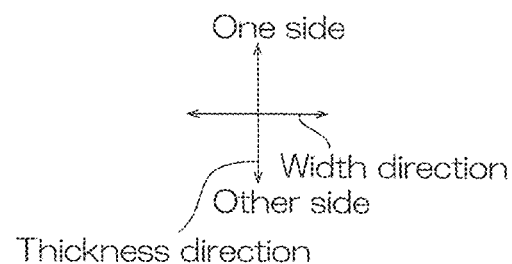

FIG. 2
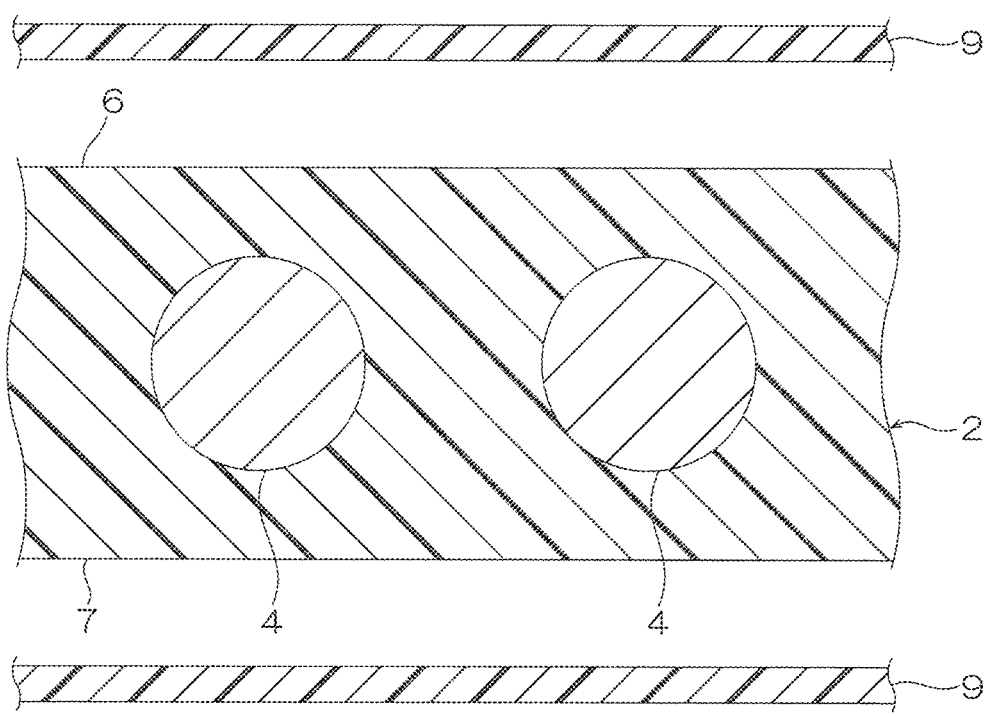
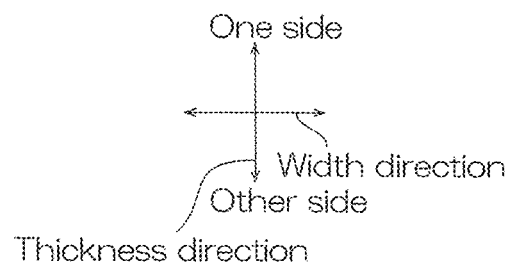

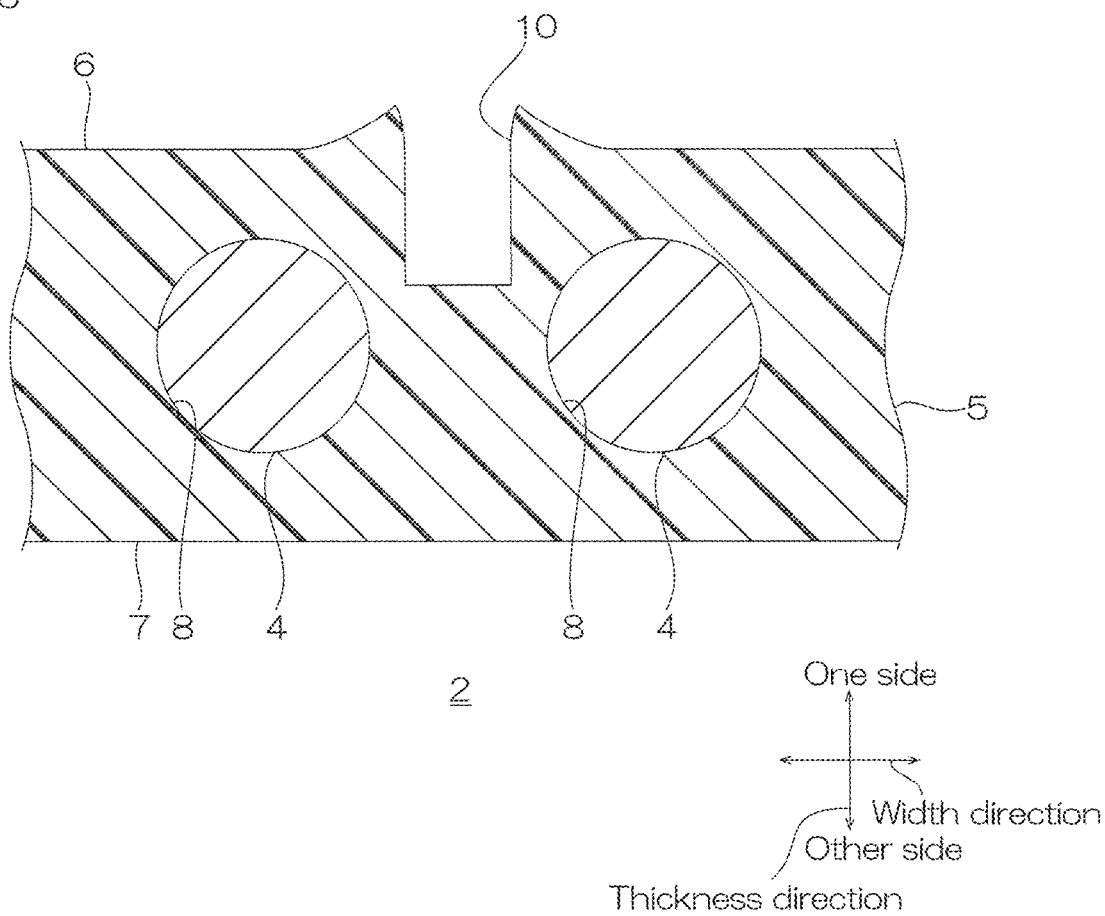

LAMINATED SHEET

CROSS REFERENCE TO RELATED APPLICATION

The present application claims priority from Japanese Patent Application No. 2020-024311 filed on Feb. 17, 2020, the contents of which are hereby incorporated by reference into this application.

TECHNICAL FIELD

The present invention relates to a laminated sheet.

BACKGROUND ART

Conventionally, a sheet-shaped inductor including a writing, and a magnetic layer covering the wiring and containing flat-shaped magnetic particles has been known (ref for example, Patent Document 1 below).

PRIOR ART DOCUMENT

Patent Document

[Patent Document 1] Japanese Unexamined Patent Publication No 2019-220618

SUMMARY OF THE INVENTION

Problems to be Solved by the Invention

However, there is a case where the surface of the inductor is subjected to processing. For example, a slit may be formed in the surface of the inductor to reduce crosstalk, or the inductor may be immersed in a solution such as cleaning solution to clean the surface of the inductor.

However, when the surface of the inductor of Patent Document 1 is subjected to the processing described above, the surface of the inductor may be deformed, or the magnetic permeability may vary greatly. That is, there is a problem that the processing stability of the inductor is insufficient.

The present invention provides a laminated sheet having excellent processing stability.

Solution to the Problems

The present invention (1) includes a laminated sheet including a sheet-shaped inductor including a plurality of wirings and a magnetic layer embedding the plurality of wirings, and a processing stability layer disposed on at least one surface in a thickness direction of the inductor, wherein the magnetic layer includes a binder and a magnetic particle having a generally flat shape and whose material is a metal; the processing stability layer includes a cured product of a thermosetting resin composition; and the thermosetting resin composition includes a thermosetting resin as an essential component, and at least one kind of particle, as an optional component, selected from the group consisting of a first particle having a generally spherical shape and a second particle having a generally flat shape and whose material is an inorganic compound.

Since the laminated sheet includes the processing stability layer, it is excellent in processing stability.

The present invention (2) includes the laminated sheet described in (1) satisfying at least one test of the following test (a) to test (e).

Test (a): the laminated sheet is trimmed into a 3 cm square piece to fabricate a sample, and the relative permeability $\mu 1$ thereof at a frequency of 10 MHz is determined. Thereafter, the sample is immersed in 200 mL of copper sulfate plating solution containing 66 g/L of copper sulfate pentahydrate, 180 g/L of sulfuric acid concentration, 50 ppm of chlorine, and Top Lutina alpha at 25'C for 120 minutes, and thereafter, the relative permeability $\mu 2$ of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)} = |\mu 1 - \mu 2|/\mu 1 \times 100$$

Test (b): the laminated sheet is trimmed into a 3 cm square piece to fabricate a sample, and the relative permeability $\mu 3$ thereof at a frequency of 10 MHz is determined. Thereafter, the sample is immersed in 200 mL of an acid active aqueous solution containing 55 g/L of sulfuric acid at 25° C. for 1 minute, and thereafter, the relative permeability $\mu 4$ of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)} = |\mu 3 - \mu 4|/\mu 3 \times 100$$

Test (c): the laminated sheet is trimmed into a 3 cm square piece to fabricate a sample, and the relative permeability $\mu 5$ thereof at a frequency of 10 MHz is determined. Thereafter, the sample is immersed in 200 mL of Reduction Solution Securiganth P manufactured by Atotech Japan K.K. at 45° C. for 5 minutes, and thereafter, the relative permeability $\mu 6$ of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)} = |\mu 5 - \mu 6|/\mu 5 \times 100$$

Test (d): the laminated sheet is trimmed into a 3 cm square piece to fabricate a sample, and the relative permeability $\mu 7$ thereof at a frequency of 10 MHz is determined. Thereafter, the sample is immersed in 200 mL of Concentrate Compact CP manufactured by Atotech Japan K.K. at 80° C. for 15 minutes, and thereafter, the relative permeability $\mu 8$ of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)} = |\mu 7 - \mu 8|/\mu 7 \times 100$$

Test (e): the laminated sheet is trimmed into a 3 cm square piece to fabricate a sample, and the relative permeability $\mu 9$ thereof at a frequency of 10 MHz is determined hereafter, the sample is immersed in 200 mL of Swelling Dip Securiganth P manufactured by Atotech Japan K.K. at 60° C. for 5 minutes, and thereafter, the relative permeability $\mu 10$ of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)} = |\mu 9 - \mu 10|/\mu 9 \times 100$$

Since the laminated sheet satisfies at least one test of the test (a) to test (e), it is excellent in stability with respect to process processing using a chemical solution.

The present invention (3) includes the laminated sheet described in (1) or (2), wherein the arithmetic average roughness Ra of one surface in the thickness direction of the laminated sheet is 10 μm or less.

Since the laminated sheet has the arithmetic average roughness Ra of one surface in the thickness direction of 10 μm or less, it can ensure excellent mountability.

Effect of the Invention

The laminated sheet of the present invention is excellent in processing stability.

BRIEF DESCRIPTION OF THE DRAWINGS

FIG. 1 shows a front cross-sectional view of one embodiment of a laminated sheet of the present invention.

FIG. 2 shows a front cross-sectional view of an inductor in the middle of production of the laminated sheet shown in FIG. 1.

FIG. 4A illustrating a modified example in which a via is formed in the laminated sheet, FIG. 4B illustrating a modified example in which a processing stability layer newly fills the via, and FIG. 4C illustrating a modified example in which the via exposes a portion of a wiling.

FIG. 5A illustrating a modified example in which a processing stability layer is disposed on the other surface in a thickness direction of an inductor, FIG. 5B illustrating a modified example in which a via is formed in the laminated sheet shown in FIG. 5A, FIG. 5C illustrating a modified example in which a processing stability layer newly fills the via in the laminated sheet shown in FIG. 5B, and FIG. 5D illustrating a modified example in which the via exposes a portion of a wiring.

FIG. 6 shows a front cross-sectional view in which a slit is formed in a laminated sheet of Comparative Example 1.

EMBODIMENT OF THE INVENTION

One Embodiment

Figure 3:
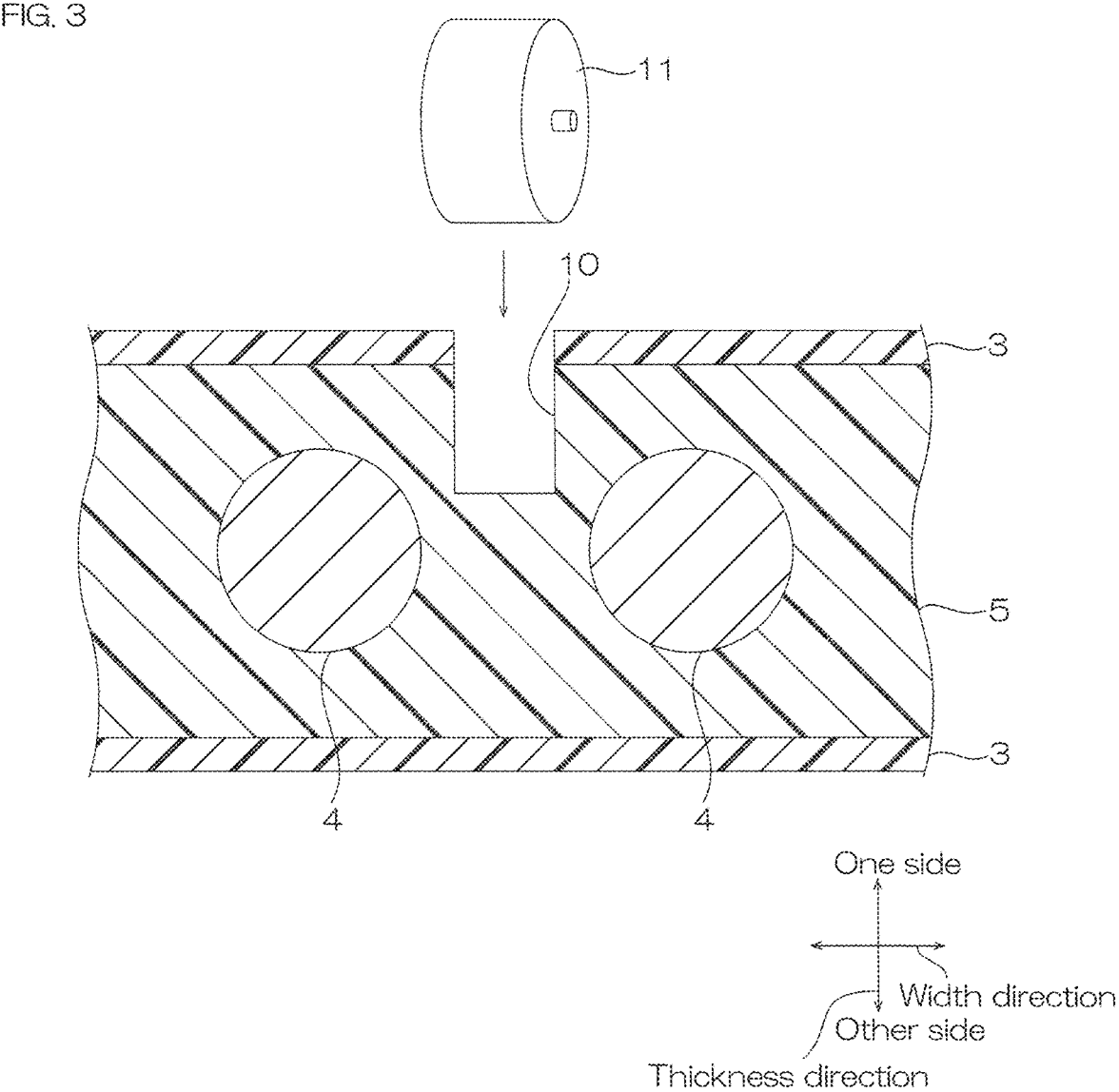
FIG. 3 shows a front cross-sectional view of an embodiment in which a slit is formed in the laminated sheet shown in FIG. 1.

One embodiment of a laminated sheet of the preset invention is described with reference to FIG. 1.

A laminated sheet 1 has a predetermined thickness, and has a sheet shape extending in a plane direction perpendicular to a thickness direction. The laminated sheet 1 has a sheet-shaped inductor 2, and a processing stability layer 3.

The inductor 2 has a predetermined thickness, and has the same outer shape as the laminated sheet 1. The inductor 2 includes a plurality of wirings 4, and a magnetic layer 5.

The plurality of wirings 4 are adjacent to each other at spaced intervals in a direction (hereinafter, may be referred to as a width direction) perpendicular to a direction in which each of the wirings 4 extends and the thickness direction. The plurality of wirings 4 are parallel with each other. A shape, a dimension, a configuration, a material, and a formulation (filling rate, content ratio, or the like) of the wiring 4 are, for example, described in Japanese Unexamined Patent Publication No. 2019-220618 or the like. Preferably, the wiring 4 has a generally circular shape when viewed in the cross-sectional view (front cross-sectional view along a direction perpendicular to the direction in which the wiring 4 extends), and the lower limit of the diameter thereof is, for example, 25 μm, and the upper limit of the diameter thereof is, for example, 2,000 μm. The wiring 4 preferably includes a conducting wiring made of a conductor, and an insulating film covering a peripheral surface of the conducting wiring. The lower limit of an interval between the wirings 4 adjacent to each other is, for example, 10 μm, preferably 50 μm, and the upper limit of an interval between the wirings 4 adjacent to each other is, for example, 5,000 μm, preferably 3,000 μm. The upper limit of a ratio (diameter/interval) of the diameter of the wiring 4 to the interval between the wirings 4 adjacent to each other is, for example, 200, preferably 50, and the lower limit thereof is, for example, 0.01, preferably 0.1.

The magnetic layer 5 improves the inductance of the laminated sheet 1. The magnetic layer 5 has the same outer shape as the laminated sheet 1 when viewed from the top. The magnetic layer 5 has a plate shape extending in the plane direction. Further, the magnetic layer 5 embeds the plurality of wirings 4 when viewed in the cross-sectional view. The magnetic layer 5 has a one surface 6, an other surface 7, and an inner peripheral surface 8.

The one surface 6 forms one surface in the thickness direction of the magnetic layer 5.

The other surface 7 forms the other surface in the thickness direction of the magnetic layer 5. The other surface 7 is spaced apart from the other side in the thickness direction of the one surface 6.

The inner peripheral surface 8 is spaced apart from the one surface 6 and the other surface 7 in the thickness direction. The inner peripheral surface 8 is located between the one surface 6 and the other surface 7 in the thickness direction. The inner peripheral surface 8 is in contact with the outer peripheral surface of the wiring 4.

The magnetic layer 5 contains a binder and magnetic particles Specifically, a material for the magnetic layer 5 is a magnetic composition containing the binder and the magnetic particles.

The binder is a matrix for dispersing the magnetic particles. Examples of the binder include thermoplastic resins such as an acrylic resin and thermosetting resins such as an epoxy resin composition. The acrylic resin includes, for example, a carboxyl group-including acrylic acid ester copolymer. The epoxy resin composition includes, for example, an epoxy resin (cresol novolac epoxy resin or the like) as a main agent, a curing agent for an epoxy resin (phenol resin or the like), and a curing accelerator for an epoxy resin (imidazole compound or the like). As the binder, the thermoplastic resin and the thermosetting resin can be used alone or in combination of two or more, and preferably, the thermoplastic resin and the thermosetting resin are used in combination of two or more. A volume ratio of the binder in the magnetic composition is a remaining portion of a volume ratio of the magnetic particles to be described later.

The magnetic particles are, for example, dispersed in the binder. In the present embodiment, the magnetic particles have a generally flat shape. The generally flat shape includes a generally plate shape.

The lower limit of a flat ratio (flat degree) of the magnetic particles is, for example, 8, preferably 15, and the upper limit thereof is, for example, 500, preferably 450. The flat ratio is, for example, calculated as an aspect ratio obtained by dividing a median diameter of the magnetic particles by an average thickness of the magnetic particles.

The lower limit of the median diameter of the magnetic particles is, for example, 3.5 μm, preferably 10 μm, and the upper limit thereof is, for example, 200 μm, preferably 150 μm. The lower limit of the average thickness of the magnetic particles is, for example, 0.1 μm, preferably 0.2 μm, and the upper limit thereof is, for example, 3.0 μm, preferably 2.5 μm.

Further, a material for the magnetic particles is a metal. Examples of the metal include magnetic bodies such as a soft magnetic body and a hard magnetic body. Preferably, from the viewpoint of ensuring excellent inductance, a soft magnetic body is used.

Examples of the soft magnetic body include a single metal body containing one kind of metal element in a state of a pure material and an alloy body which is a eutectic (mixture) of one or more kinds of metal element (first metal element) and one or more kinds of metal element (second metal element) and/or non-metal element (carbon, nitrogen, silicon, phosphorus, or the like). These may be used alone or in combination of two or more.

An example of the single metal body includes a metal single body consisting of only one kind of metal element (first metal element). The first metal element is, for example, appropriately selected from iron (Fe), cobalt (Co), nickel (Ni), and another metal element that can be included as the first metal element of the soft magnetic body.

Further, examples of the single metal body include an embodiment including a core including only one kind of metal element and a surface layer including an inorganic material and/or an organic material which modify/modifies a portion of or the entire surface of the core, and an embodiment in which an organic metal compound and an inorganic metal compound including the first metal element are decomposed (thermally decomposed or the like). More specifically, an example of the latter embodiment includes an iron powder (may be referred to as a carbonyl iron powder) in which an organic iron compound (specifically, carbonyl iron) including iron as the first metal element is thermally decomposed. The position of a layer including the inorganic material and/or the organic material modifying a portion including only one kind of metal element is not limited to the surface described above. The organic metal compound and the inorganic metal compound that can obtain the single metal body are not particularly limited, and can be appropriately selected from a known or conventional organic metal compound and inorganic metal compound that can obtain the single metal body of the soft magnetic body.

The alloy body is not particularly limited as long as it is a eutectic of one or more kinds of metal element (first metal element) and one or more kinds of metal element (second metal element) and/or non-metal element (carbon, nitrogen, silicon, phosphorus, or the like) and can be used as an alloy body of a soft magnetic body.

The first metal element is an essential element in the alloy body, and examples thereof include iron (Fe), cobalt (Co), and nickel (Ni). When the first metal element is Fe, the alloy body is referred to as a Fe-based alloy; when the first metal element is Co, the alloy body is referred to as a Co-based alloy; and when the first metal element is Ni, the alloy body is referred to as a Ni-based alloy.

The second metal element is an element (auxiliary component) which is auxiliary included in the alloy body, and is a metal element which is compatible (eutectic) with the first metal element. Examples thereof include iron (Fe) (when the first metal element is other than Fe), cobalt (Co) (when the first metal element is other than Co), nickel (Ni) (when the first metal element is other than Ni), chromium (Cr), aluminum (Al), silicon (Si), copper (Cu), silver (Ag), manganese (Mn), calcium (Ca), barium (Ba), titanium (Ti), zirconium (Zr), hafnium (Hf), vanadium (V), niobium (Nb), tantalum (Ta), molybdenum (Mo), tungsten (W), ruthenium (Ru), rhodium (Rh), zinc (Zn), gallium (Ga), indium (in), germanium (Ge), tin (Sn), lead (Pb), scandium (Sc), yttrium (Y), strontium (Sr), and various rare earth elements. These may be used alone or in combination of two or more.

The non-metal element is an element (auxiliary component) which is auxiliary included in the alloy body and is a non-metal element which is compatible (eutectic) with the first metal element, and examples thereof include boron (B), carbon (C), nitrogen (N), silicon (Si), phosphorus (P), and sulfur (S). These may be used alone or in combination of two or more.

Examples of the Fe-based alloy which is one example of an alloy body include magnetic stainless steel (Fe—Cr—Al—Si alloy) (including electromagnetic stainless steel), Sendust (Fe—Si—Al alloy) (including Supersendust), permalloy (Fe—Ni alloy), Fe—Ni—Mo alloy, Fe—Ni—Mo—Cu alloy, Fe—Ni—Co alloy, Fe—Cr alloy, Fe—Cr—Al alloy, Fe—Ni—Cr alloy, Fe—Ni—Cr—Si alloy, silicon copper (Fe—Cu—Si alloy), Fe—Si alloy, Fe—Si—B(—Cu—Nb) alloy, Fe—B—Si—Cr alloy, Fe—Si—Cr—Ni alloy, Fe—Si—Cr alloy, Fe—Si—Al—Ni—Cr alloy, Fe—Ni—Si—Co alloy, Fe—N alloy, Fe—C alloy, Fe—B alloy, Fe—P alloy, ferrite (including stainless steel-based ferrite, and furthermore, soft ferrite such as Mn—Mg-based ferrite, Mn—Zn-based ferrite, Ni—Zn-based ferrite, Ni—Zn—Cu-based ferrite, Cu—Zn-based ferrite, and Cu—Mg—Zn-based ferrite), Permendur (Fe—Co alloy), Fe—Co—V alloy, and Fe-based amorphous alloy.

Examples of the Co-based alloy which is one example of an alloy body include Co—Ta—Zr and a cobalt (Co)-based amorphous alloy.

An example of the Ni-based alloy which is one example of an alloy body includes a Ni—Cr alloy.

A more detailed formulation of the above-described magnetic composition is described in Japanese Unexamined Patent Publication No. 2014-165363 or the like.

The lower limit of a volume ratio of the magnetic particles in the magnetic composition is, for example, 40% by volume, preferably 50% by volume, more preferably 60% by volume, and the upper limit thereof is, for example, 95% by volume, preferably 90% by volume.

The lower limit of a thickness of the inductor 2 is, for example, 30 μm, preferably 40 μm, and the upper limit of the thickness of the inductor 2 is, for example, 2,500 μm, preferably 2,000 μm. The lower limit of a ratio of the thickness of the inductor 2 to the thickness of the laminated sheet 1 is, for example, 0.1, preferably 0.3, more preferably 0.7, and the upper limit thereof is, for example, 0.999, preferably 0.990, more preferably 0.980.

The processing stability layer 3 improves the surface processability with respect to the one surface 6 and the other surface 7 of the inductor 2. The processing stability layer 3 is disposed on the one surface 6 and the other surface 7 of the inductor 2. Specifically, the processing stability layer 3 is in contact with the entire one surface 6 and the entire other surface 7 of the magnetic layer 5. Each of the two processing stability layers 3 has a sheet shape extending in the plane direction.

One surface in the thickness direction of the processing stability layer 3 located on one side in the thickness direction of the inductor 2 forms one surface in the thickness direction of the laminated sheet 1. The upper limit of the arithmetic average roughness Ra of one surface in the thickness direction of the laminated sheet 1 is, for example, 10 μm, preferably 5 μm, more preferably 1 μm, and the lower limit thereof is, for example, 0.001 μm.

The other surface in the thickness direction of the processing stability layer 3 located on the other surface in the thickness direction of the inductor 2 forms the other surface in the thickness direction of the laminated sheet 1. The upper limit of the arithmetic average roughness Ra of one surface in the thickness direction of the other surface in the thickness direction of the laminated sheet 1 is, for example, 10 μm, preferably 5 μm, more preferably 1 μm, and the lower limit thereof is, for example, 0.001 μm.

When the arithmetic average roughness Ra of one surface and/or the other surface in the thickness direction of the laminated sheet 1 is the above-described upper limit or less, it is possible to ensure excellent mountability.

The arithmetic average roughness Ra of one surface and the other surface in the thickness direction of the laminated sheet 1 is determined with a stylus-type surface shape measuring device.

The processing stability layer 3 includes a cured product of a thermosetting resin composition. In other words, a material for the processing stability layer 3 includes the thermosetting resin composition.

The thermosetting resin composition includes a thermosetting resin as an essential component and particles as an optional component.

The thermosetting resin includes a main agent, a curing agent, and a curing accelerator.

Examples of the main agent include an epoxy resin and a silicone resin, and preferably, an epoxy resin is used. Examples of the epoxy resin include bifunctional epoxy resins such as a bisphenol A epoxy resin, a bisphenol F epoxy resin, a bisphenol S epoxy resin, a modified bisphenol A epoxy resin, a modified bisphenol F epoxy resin, a modified bisphenol S epoxy resin, and a biphenyl epoxy resin: and trifunctional or more polyfunctional epoxy resins such as a phenol novolac epoxy resin, a cresol novolac epoxy resin, a trishydroxyphenylmethane epoxy resin, a tetraphenylol ethane epoxy resin, and a dicyclopentadiene epoxy resin. These epoxy resins may be used alone or in combination of two or more. Preferably, a bifunctional epoxy resin is used, more preferably, a bisphenol A epoxy resin is used.

The lower limit of an epoxy equivalent of the epoxy resin is, for example, 10 g/eq., and the upper limit thereof is, for example, 1.000 g/eq.

When the main agent is the epoxy resin, examples of the curing agent include a phenol resin and an isocyanate resin. Examples of the phenol resin include polyfunctional phenol resins such as a phenol novolac resin, a cresol novolac resin, a phenol aralkyl resin, a phenol biphenylene resin, a dicyclopenadiene phenol resin, and a resol resin. These may be used alone or in combination of two or more. As the phenol resin, preferably, a phenol novolac resin and a phenol biphenylene resin are used. When the main agent is the epoxy resin and the curing agent is the phenol resin, the lower limit of the total sum of hydroxyl groups in the phenol resin is, for example, 0.7 equivalents, preferably 0.9 equivalents, and the upper limit thereof is, for example, 1.5 equivalents, preferably 1.2 equivalents with respect to t equivalent of epoxy groups in the epoxy resin. Specifically, the lower limit of the number of parts by mass of the curing agent is, for example, 1 part by mass, and the upper limit thereof is, for example, 50 parts by mass with respect to 100 parts by mass of the main agent.

The curing accelerator is a catalyst (thermosetting catalyst) which promotes curing of the main agent (preferably, epoxy resin curing accelerator), and examples thereof include an organic phosphorus compound, and an imidazole compound such as 2-phenyl-4-methyl-5-hydroxymethylimidazole (2P4MHZ). The lower limit of the number of parts by mass of the curing accelerator is, for example, 0.05 parts by mass, and the upper limit thereof is, for example, 5 parts by mass with respect to 100 parts by mass of the main agent.

The particles are an optional component in the thermosetting resin composition. The particles are dispersed in the thermosetting resin. The particles are at least one kind selected from the group consisting of first particles and second particles.

The first particles have a generally spherical shape. The lower limit of the median diameter of the first particles is, for example, 1 μm, preferably 5 μm, and the upper limit of the median diameter of the first particles is, for example, 250 μm, preferably 200 μm. The median diameter of the first particles is determined with a laser diffraction particle size distribution measuring device. The median diameter of the first particles can be also determined, for example, by binarization process by cross-sectional observation of the laminated sheet 1.

A material for the first particles is not particularly limited. Examples of the material for the first particles include metals, an Inorganic compound, and an organic compound, and in order to increase the thermal expansion coefficient, preferably, metals and an inorganic compound are used.

The metals are included in the thermosetting resin composition when the processing stability layer 3 functions as an inductance-improving layer. An example of the metals includes the magnetic body illustrated in the magnetic layer 5, and preferably, an organic iron compound including iron as the first metal element is used, more preferably, carbonyl iron is used.

The inorganic compound is included in the thermosetting resin composition when the processing stability layer 3 functions as a thermal expansion coefficient-suppressing layer. An example of the inorganic compound includes an inorganic filler, and specifically, silica and alumina are used, preferably, silica is used.

Specifically, as the first particles, preferably, spherical silica is used, and preferably, spherical carbonyl iron is used.

The second particles have a generally flat shape. The generally flat shape includes a generally plate shape.

The lower limit of a flat ratio (flat degree) of the second particles is, for example, 8, preferably 15, and the upper limit thereof is, for example, 500, preferably 450. The flat ratio of the second particles is determined by the same calculation method as the flat ratio of the magnetic particles in the magnetic layer 5 described above.

The lower limit of the median diameter of the second particles is, for example, 1 μm, preferably 5 μm, and the upper limit of the median diameter of the second particles is, for example, 250 μm, preferably 200 μm. The median diameter of the second particles is determined in the same manner as that of the first particles.

The lower limit of the average thickness of the second particles is, for example, 0.1 μm, preferably 0.2 μm, and the upper limit thereof is, for example, 3.0 μm, preferably 2.5 μm.

A material for the second particles is an inorganic compound. An example of the inorganic compound includes a thermally conductive compound such as boron nitride. Accordingly, preferably, the inorganic compound is included in the thermosetting resin composition when the processing stability layer 3 functions as a thermal conductivity-improving layer.

Specifically, as the second particles, preferably, a flat-shaped boron nitride is used.

One kind or both of the first particles and the second particles are included in the thermosetting resin composition.

The lower limit of the number of parts by mass of the particles (first particles and/or second particles) is, for example, 10 parts by mass, preferably 50 parts by mass, and the upper limit thereof is, for example, 2,000 parts by mass, preferably 1,500 parts by mass with respect to 100 parts by mass of the thermosetting resin. Further, the lower limit of a content ratio of the particles in the cured product is, for example, 10% by mass, and the upper limit thereof is, for example, 90% by mass. When both of the first particles and the second particles are included in the thermosetting resin composition, the lower limit of the number of parts by mass of the second particles is, for example, 30 parts by mass, and the upper limit thereof is, for example, 300 parts by mass with respect to 100 parts by mass of the first particles.

Since the particles are an optional component in the thermosetting resin composition, the thermosetting resin composition may not include the particles.

The lower limit of a thickness of the processing stability layer 3 is, for example, 1 μm, preferably 10 μm, and the upper limit thereof is, for example, 1,000 μm, preferably 100 μm. The lower limit of a ratio of the thickness of the processing stability layer 3 in the thickness of the laminated sheet 1 is, for example, 0.001, preferably 0.005, more preferably 0.01, and the upper limit thereof is, for example, 0.5, preferably 0.3, more preferably 0.1.

The thickness of the two processing stability layers 3 may be the same or different from each other. The lower limit of a ratio (thickness of the processing stability layer 3 on one side in the thickness direction/thickness of the processing stability layer 3 on the other side) of the thickness of the processing stability layer 3 located on one side in the thickness direction of the inductor 2 with respect to the thickness of the processing stability layer 3 located on the other side in the thickness direction of the inductor 2 is, for example, 0.05, preferably 0.1, and the upper limit thereof is 10.

Next, a method for producing the laminated sheet 1 is described with reference to FIGS. 1 to 2.

As shown in FIG. 2, first, in this method, the inductor 2 is prepared. To prepare the inductor 2, the plurality of wirings 4 are prepared to be sandwiched between the two magnetic sheets. The inductor 2 is, for example, prepared by a method described in Japanese Unexamined Patent Publication No. 2019-220618 or the like.

In this method, subsequently, two processing stability sheets 9 are prepared.

The processing stability sheet 9 is formed from the material for the processing stability layer 3 into a sheet shape. The processing stability sheet 9 preferably includes a B-stage thermosetting resin composition.

The above-described material can be also prepared as a varnish by further blending a solvent into the above-described thermosetting resin composition. In addition, a thermoplastic resin can be further blended in the material.

Examples of the solvent include alcohol compounds such as methanol, ether compounds such as dimethyl ether, and ketone compounds such as methyl ethyl ketone and cyclohexanone. A mixing ratio of the solvent is adjusted so that the lower limit of the mass ratio of the solid content in the varnish is, for example, 10% by mass, and the upper limit thereof is, for example, 95% by mass.

An example of the thermoplastic resin includes a thermoplastic resin illustrated in the binder of the magnetic layer 5. The lower limit of the number of parts by mass of the thermoplastic resin is, for example, 1 part by mass, and the upper limit thereof is, for example, 100 parts by mass with respect to 100 parts by mass of the thermosetting resin.

In this method, the varnish is applied to the surface of a release sheet that is not shown to be then dried to form the processing stability sheet 9.

Subsequently, the two processing stability sheets 9 and the inductor 2 are pressed from both sides in the thickness direction. The two processing stability sheets 9 are attached to each of the one surface 6 and the other surface 7 of the inductor 2.

Thereafter, those are heated to bring the processing stability sheet 9 into a C-stage state. Thus, the processing stability layer 3 disposed on both sides in the thickness direction of the inductor 2 is formed.

As shown in FIG. 1, in this manner, the laminated sheet 1 is obtained.

The laminated sheet 1 satisfies, for example, at least one test of the test (a) to test (e).

Test (a): the laminated sheet 1 is trimmed into a 3 cm square piece to fabricate a sample, and the relative permeability $\mu 1$ thereof at a frequency of 10 MHz is determined. Thereafter, the sample is immersed in 200 mL of copper sulfate plating solution containing 66 g/L of copper sulfate pentahydrate, 180 g/L of sulfuric acid concentration, 50 ppm of chlorine, and Top Lutina alpha manufactured by Okuno Chemical Industries Co., Ltd. at 25° C. for 120 minutes, and thereafter, the relative permeability $\mu 2$ of the sample at a frequency of 10 MHz is determined. By the following formula, a rate of change of the magnetic permeability before and after the immersion is determined. As a result, the rate of change of the magnetic permeability of the sample is 5% or less.

Rate of Change of Magnetic Permeability (%)=|μ1−μ2|/μ1×100

Test (b): the laminated sheet 1 is trimmed into a 3 cm square piece to fabricate a sample, and the relative permeability $\mu 3$ thereof at a frequency of 10 MHz is determined. Thereafter, the sample is immersed in 200 mL of an acid active aqueous solution containing 55 g/L of sulfuric acid at 25° C. for 1 minute, and thereafter, the relative permeability $\mu 4$ of the sample at a frequency of 10 MHz is determined. By the following formula, a rate of change of the magnetic permeability before and after the immersion is determined. As a result, the rate of change of the magnetic permeability of the sample is 5% or less.

Rate of Change of Magnetic Permeability (%)=|μ3−μ4|/μ3×100

Test (c): the laminated sheet 1 is trimmed into a 3 cm square piece to fabricate a sample, and the relative permeability µ5 thereof at a frequency of 10 MHz is determined. Thereafter, the sample is immersed in 200 mL of Reduction Solution Securiganth P manufactured by Atotech Japan K.K. at 45° C. for 5 minutes, and thereafter, the relative permeability µ6 of the sample at a frequency of 10 MHz is determined. By the following formula, a rate of change of the magnetic permeability before and after the immersion is determined. As a result, the rate of change of the magnetic permeability of the sample is 5% or less.

Rate of Change of Magnetic Permeability (%)=|µ5−µ6|/µ5×100

Test (d): the laminated sheet 1 is trimmed into a 3 cm square piece to fabricate a sample, and the relative permeability µ7 thereof at a frequency of 10 MHz is determined. Thereafter, the sample is immersed in 200 mL, of Concentrate Compact CP manufactured by Atotech Japan K.K. at 80° C. for 15 minutes, and thereafter, the relative permeability µ8 of the sample at a frequency of 10 MHz is determined. By the following formula, a rate of change of the magnetic permeability before and after the immersion is determined. As a result, the rate of change of the magnetic permeability of the sample is 5% or less.

Rate of Change of Magnetic Permeability (%)=|µ7−µ8|/µ7×100

Test (e): the laminated sheet 1 is trimmed into a 3 cm square piece to fabricate a sample, and the relative permeability µ9 thereof at a frequency of 10 MHz is determined. Thereafter, the sample is immersed in 200 mL of Swelling Dip Securiganth P manufactured by Atotech Japan K.K. at 60° C. for 5 minutes, and thereafter, the relative permeability µ10 of the sample at a frequency of 10 MHz is determined. By the following formula, a rate of change of the magnetic permeability before and after the immersion is determined. As a result, the rate of change of the magnetic permeability of the sample is 5% or less.

Rate of Change of Magnetic Permeability (%)=|µ9−µ10|/µ9×100

When the test (a) is satisfied, the upper limit of the rate of change of the magnetic permeability of the sample in the test (a) is preferably 4%, more preferably 3%.

When the test (a) is satisfied, the laminated sheet 1 is excellent in stability with respect to the immersion of the copper sulfate solution of the electrolytic copper plating.

When the test (b) is satisfied, the upper limit of the rate of change of the magnetic permeability of the sample in the test (b) is preferably 4%, more preferably 3%.

When the test (b) is satisfied, the laminated sheet 1 is excellent in stability with respect to the immersion of the acid active solution.

When the test (c) is satisfied, the upper limit of the rate of change of the magnetic permeability of the sample in the test (c) is preferably 4%, more preferably 3%.

Reduction Solution Securiganth P manufactured by Atotech Japan K.K. in the test (c) includes a sulfuric acid aqueous solution, and is used as a neutralizing solution (neutralizing agent or an aqueous solution for neutralization). Therefore, when the test (c) is satisfied, the laminated sheet 1 is excellent in stability with respect to the immersion of the neutralizing solution.

When the test (d) is satisfied, the upper limit of the rate of change of the magnetic permeability of the sample in the test (d) is preferably 4%, more preferably 3%.

Concentrate Compact CP manufactured by Atotech Japan K.K. in the test (d) includes a potassium permanganate solution. Therefore, when the test (d) is satisfied, the laminated sheet 1 is excellent in stability with respect to the immersion of the potassium permanganate solution of desmear (cleaning).

When the test (e) is satisfied, the upper limit of the rate of change of the magnetic permeability of the sample in the test (e) is preferably 4%, more preferably 3%.

Swelling Dip Securiganth P manufactured by Atotech Japan K.K. in the test (e) is an aqueous solution containing glycol ethers and sodium hydroxide, and is used as a swelling solution. Therefore, when the test (e) is satisfied, the laminated sheet 1 is excellent in stability with respect to the immersion of the swelling solution.

Preferably, all of the test (a) to test (e) are satisfied. Therefore, the laminated sheet 1 is excellent in stability with respect to the immersion of the copper sulfate solution of the electrolytic copper plating, the acid active solution, the neutralizing solution, the potassium permanganate solution of the desmear (cleaning), and the swelling solution, and is excellent in stability with respect to various processes using these solutions.

The laminated sheet 1 is immersed in various chemical solutions (including the copper sulfate solution of the electrolytic copper plating, the acid active solution, the neutralizing solution, the potassium permanganate solution of the desmear (cleaning), the swelling solution, or the like) in accordance with its purpose and applications to be subjected to surface treatment.

Subsequently, as shown in FIG. 3, as processing with respect to one surface in the thickness direction of the laminated sheet 1, an embodiment of forming a slit 10 is described.

In this embodiment, in order to reduce the crosstalk between the wirings 4 adjacent to each other, the slit 10 is formed on one side in the thickness direction of the magnetic layer 5.

The slit 10 is located between the wirings 4 adjacent to each other when projected in the thickness direction. The slit 10 penetrates the processing stability layer 3 in the thickness direction, and is formed in one surface in the thickness direction of the magnetic layer 5 to the middle thereof. The slit 10 is parallel with the wiring 4, and is along the direction in which the wiring 4 extends.

A width of the slit 10 is not particularly limited. The lower limit of the width of the slit 10 is, for example, 10 µm, and the upper limit thereof is 1,000 µm. A depth of the slit 10 is not particularly limited.

A method for forming the slit 10 is not particularly limited, and examples thereof include contact-type cutting using a dicing saw 11 and non-contact-type cutting using a laser (not shown). The dicing saw 11 includes a dicing blade having a disc shape.

In any method described above, processing is carried out from one side in the thickness direction of the laminated sheet 1 with respect to one surface in the thickness direction of the laminated sheet 1.

Thus, the laminated sheet 1 in which the slit 10 is formed is obtained.

Function and Effect of One Embodiment

Then, since the laminated sheet 1 includes the processing stability layer 3, it is excellent in processing stability.

In detail, as shown in FIG. 6, when the laminated sheet 1 does not include the processing stability layer 3 and consists of only the inductor 2, the inner end portion facing the slit 10 in the one surface 6 of the magnetic layer 5 warps up (is raised) toward one side in the thickness direction at the time of forming the slit 10 in the magnetic layer 5. In this phenomenon, when the slit 10 is formed in the magnetic layer 5, since the magnetic particles are made of the metals, they are difficult to crack, and since the shape of these are generally flat, the magnetic layer 5 moves to one side in the thickness direction, while entraining the binder around the magnetic particles.

However, as shown in FIG. 3, the laminated sheet 1 of one embodiment includes the processing stability layer 3, and the processing stability layer 3 contains at least one kind of particles, as an optional component, selected from the group consisting of the first particles and the second particles.

Specifically, when the processing stability layer 3 does not contain the particles, there is no deformation of the processing stability layer 3 due to the movement of the above-described particles, and therefore, it is possible to suppress the deformation of the magnetic layer 5 by the cured product in the processing stability layer 3.

When the processing stability layer 3 contains the first particles having a generally spherical shape, the movement of the first particles in the processing stability layer 3 is suppressed, while entraining the binder around the first particles. Therefore, the deformation of the magnetic layer 5 can be suppressed by the cured product in the processing stability layer 3.

When the processing stability layer 3 contains the second particles whose material is an inorganic compound, even when the shape of these is generally flat, since the material for the second particles is the fragile inorganic compound, the second particles easily crack at the time of forming the slit 10 in the magnetic layer 5. Therefore, the movement of the second particles in the processing stability layer 3 is suppressed. As a result, the deformation of the magnetic layer 5 can be suppressed by the cured product in the processing stability layer 3.

Therefore, since the laminated sheet 1 of the present embodiment includes the processing stability laser 3 described above, when the slit 10 is formed in the laminated sheet 1, it is possible to suppress the deformation of the magnetic layer 5.

Modified Examples and Other Usage Embodiments of Laminated Sheet

In the following modified examples, the same reference numerals are provided for members and steps corresponding to each of those in the above-described one embodiment, and their detailed description is omitted. Further, each of the modified examples can achieve the same function and effect as that of one embodiment unless otherwise specified. Furthermore, one embodiment and the modified examples thereof can be appropriately used in combination.

In one embodiment a varnish is applied to a release sheet. Alternatively, for example, the varnish may be also applied to the one surface 6 and the other surface 7 of the magnetic layer 5.

Figure 4A:
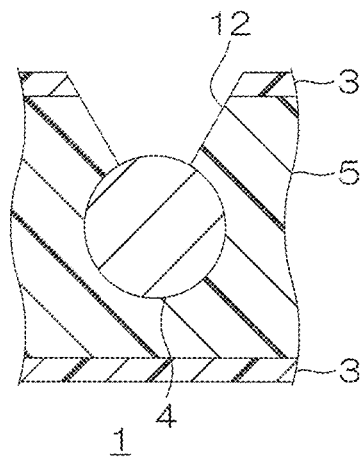
FIGS. 4A to 4C show front cross-sectional views of a usage embodiment of the laminated sheet shown in FIG. 1.

Further, as shown in FIG. 4A, it is also possible to form a via 12 in the laminated sheet 1.

The via 12 is a through hole which exposes the central portion of one surface in the thickness direction of the wiring 4 and penetrates in the thickness direction of the magnetic layer 5 and the processing stability layer 3 located on one side in the thickness direction with respect to the wiring 4. The via 12 has a generally circular shape when viewed from the top (not shown). The via 12 also has a tapered shape in which the opening area expands toward one side in the thickness direction when viewed in the cross-sectional view.

Examples of a method for forming the via 12 include contact-type opening using a drill and non-contact-type opening using a laser.

Figure 4B:
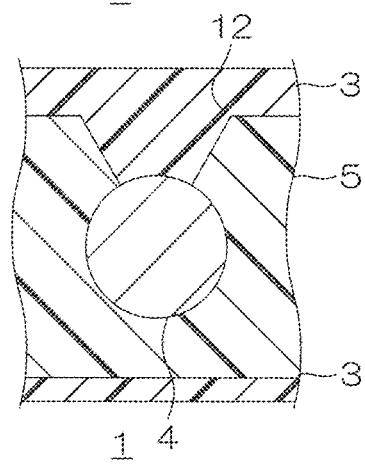

As shown in FIG. 4B, thereafter, in this method, the processing stability layer 3 further fills the wiring 4 exposed from the via 12 and the magnetic layer 5.

Figure 4C:
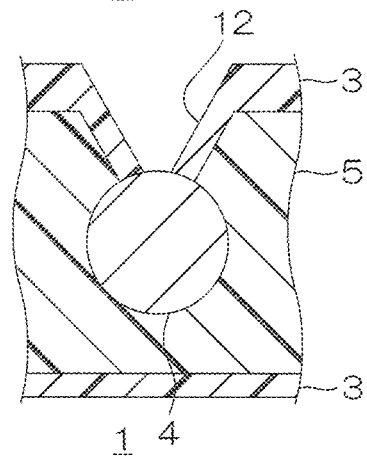

As shown in FIG. 4C, thereafter, the via 12 is formed again. However, the via 12 exposes the central portion of one surface in the thickness direction of the wiring 4, and does not expose the magnetic layer 5. That is, the inner-side surface of the magnetic layer 5 is covered with the newly filled processing stability layer 3.

Thus, the via 12 is formed, and the laminated sheet 1 in which the inner-side surface of the magnetic layer 5 corresponding thereto is covered with the processing stability layer 3 is obtained.

Figure 5A:
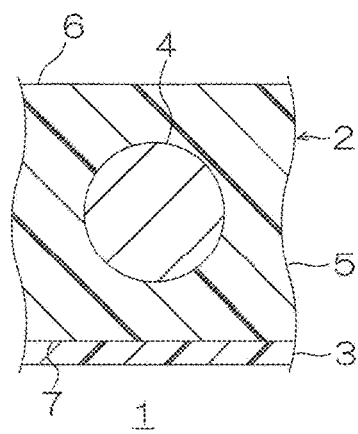
FIGS. 5A to 5D show front cross-sectional views of a modified example of a laminated sheet of one embodiment, and a usage embodiment thereof.

In one embodiment, as shown in FIG. 1, the processing stability layer 3 is disposed on one surface and the other surface in the thickness direction of the inductor 2. Alternatively, though not shown, the processing stability layer 3 may be also disposed on only one surface, or, as shown in FIG. 5A, may be disposed on only the other surface.

Figure 5B:
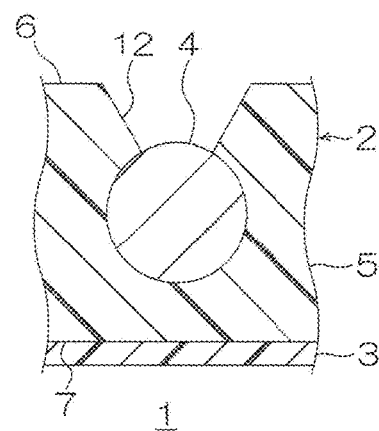

As shown in FIG. 5B, the via 12 may be also formed in the magnetic layer 5 in the laminated sheet 1 described above.

Figure 5C:
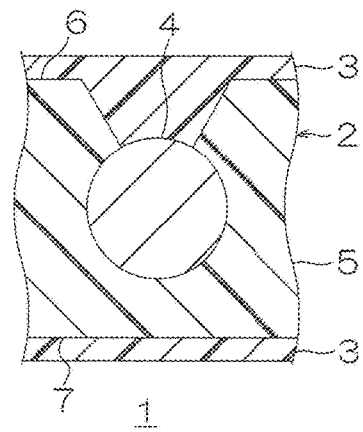

Furthermore, as shown in FIG. 5C, the processing stability layer 3 is disposed on the other surface in the thickness direction of the inductor 2, and the processing stability layer 3 may be also further formed on one surface in the thickness direction of the inductor 2 of the laminated sheet 1 in which the via 12 is formed in the inductor 2. The processing stability layer 3 on one side in the thickness direction fills the via 12.

Figure 5D:
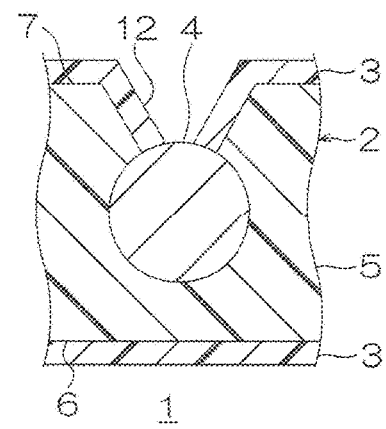

Furthermore, as shown in FIG. 5D, the via 12 is formed again. However, the via 12 exposes the central portion of one surface in the thickness direction of the wiring 4, and does not expose the magnetic layer 5.

An electrically conductive layer (not shown) can be also formed in the via 12. Examples of a material for the electrically conductive layer (not shown) include conductive materials such as copper. In the formation of the electrically conductive layer, for example, an electrolytic copper plating solution is used. Thus, the laminated sheet 1 including the electrically conductive layer (not shown) is obtained.

EXAMPLES

Next, the present invention is further described based on Example and Comparative Example shown below. The present invention is however not limited by the following Example and Comparative Example. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "Embodiment of the Invention".

Example 1

The laminated sheet 1 shown in FIG. 1 was produced based on one embodiment.

As shown in FIG. 2, first, the inductor 2 was fabricated. Specifically, the inductor 2 in which the plurality of wirings 4 having a radius of 110 µm were covered with the magnetic layer 5 consisting of a first magnetic sheet having a thickness of 100 μm and a second magnetic sheet having a thickness of 125 μm was fabricated. The first magnetic sheet contained 60% by volume of spherical magnetic powder, 9.7% by volume of cresol novolac epoxy resin (main agent), 9.7% by volume of phenol resin (curing agent), 0.3% by volume of imidazole compound (curing accelerator), and 18.7% by volume of thermoplastic resin (carboxyl group-including acrylic acid ester copolymer). The second magnetic sheet contained 55% by volume of magnetic particles made of a flat-shaped Fe—Si alloy, 11.0% by volume of cresol novolac epoxy resin (main agent), 11.0% by volume of phenol resin (curing agent), 0.4% by volume of imidazole compound (curing accelerator), and 21.2% by volume of thermoplastic resin (carboxyl group-including acrylic acid ester copolymer).

Thereafter, the two processing stability sheets 9 were prepared. The processing stability sheet 9 was formed by application and drying of a varnish containing 935 parts by mass of spherical silica particles (first particles), 100 parts by mass of bisphenol A epoxy resin (main agent of a thermosetting resin), 106 parts by mass of phenol resin (curing agent), 4 parts by mass of imidazole compound (curing accelerator), and 10 parts by mass of cyclohexanone (solvent). A content ratio of the silica particles in the processing stability sheet 9 was 55% by volume. A thickness of the processing stability sheet 9 was 40 μm. The processing stability sheet 9 was in a B-stage state.

The two processing stability sheets 9 were attached to one surface and the other surface in the thickness direction of the inductor 2. Thereafter, the processing stability sheet 9 was heated at 190° C. for one hour to be brought into a C-stage state.

Thus, the processing stability layer 3 in a C-stage state was formed. A thickness of the processing stability layer 3 was 40 μm.

Thus, the laminated sheet 1 including the inductor 2 and the processing stability layers 3 was produced.

Comparative Example 1

The inductor 2 in the middle of production, that is, the inductor 2 without including the processing stability layers 3 was referred to as the laminated sheet 1 of Comparative Example 1.

(Evaluation)

(Slit Processing)

The slit 10 was formed on one surface in the thickness direction of each of the laminated sheets 1 of Example 1 and Comparative Example 1. The slit 10 was formed by the dicing saw 11. A width of the slit 10 was 30 μm, and a depth thereof was 100 μm.

Figure 7:
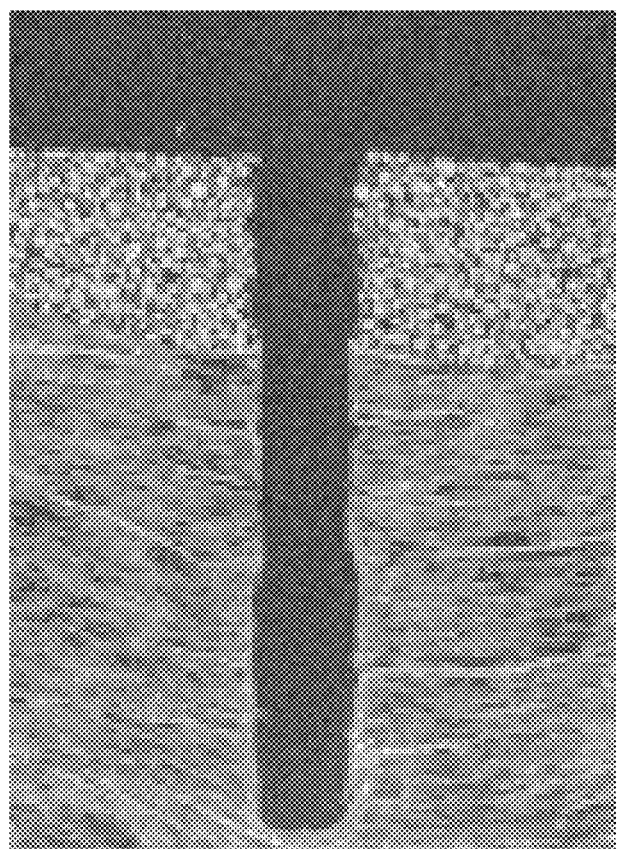
FIG. 7 shows an image processing view of an SEM image in which a slit is formed in a laminated sheet of Example 1.
Figure 8:
FIG. 8 shows an image processing view of an SEM image in which a slit is formed in a laminated sheet of Comparative Example 1.

The slit 10 in the laminated sheet 1 was observed by SEM (electron microscope). The SEM image of Example 1 is shown in FIG. 7. The SEM image of Comparative Example 1 is shown in FIG. 8.

In Example 1, in the inner end portion of the magnetic layer 5 facing the slit 10, a warp up (raise) was not observed. This case was evaluated as excellent.

In contrast, in Comparative Example 1, in the inner end portion of the magnetic layer 5 facing the slit 10, a warp up (raise) was observed. This case was evaluated as bad.

(Tests (a) to (e))

In the test (a) to test (e), each of the rate of change of the magnetic permeability of Example 1 and Comparative Example 1 was determined.

Test (a): the laminated sheet 1 was trimmed into a 3 cm square piece to fabricate a sample, and the relative permeability $\mu 1$ thereof at a frequency of 10 MHz was determined. Thereafter, the sample was immersed in 200 mL of copper sulfate plating solution containing 66 g/L of copper sulfate pentahydrate, 180 g/L of sulfuric acid concentration, 50 ppm of chlorine, and Top Lutina alpha manufactured by Okuno Chemical Industries Co, Ltd at 25° C. for 120 minutes, and thereafter, the relative permeability $\mu 2$ of the sample at a frequency of 10 MHz was determined. By the following formula, a rate of change of the magnetic permeability before and after the immersion was determined.

Rate of Change of Magnetic Permeability (%)=$|\mu 1-\mu 2|/\mu 1 \times 100$

Test (b): the laminated sheet 1 was trimmed into a 3 cm square piece to fabricate a sample, and the relative permeability $\mu 3$ thereof at a frequency of 10 MHz was determined. Thereafter, the sample was immersed in 200 mL of an acid active aqueous solution containing 55 g/L of sulfuric acid at 25° C. for 1 minute, and thereafter, the relative permeability $\mu 4$ of the sample at a frequency of 10 MHz was determined. By the following formula, a rate of change of the magnetic permeability before and after the immersion was determined.

Rate of Change of Magnetic Permeability (%)=$|\mu 3-\mu 4|/\mu 3 \times 100$

Test (c): the laminated sheet 1 was trimmed into a 3 cm square piece to fabricate a sample, and the relative permeability $\mu 5$ thereof at a frequency of 10 MHz was determined. Thereafter, the sample was immersed in 200 mL of Reduction Solution Securiganth P manufactured by Atotech Japan K.K. at 45° C. for 5 minutes, and thereafter, the relative permeability $\mu 6$ of the sample at a frequency of 10 MHz was determined. By the following formula, a rate of change of the magnetic permeability before and after the immersion was determined.

Rate of Change of Magnetic Permeability (%)=$|\mu 5-\mu 6|/\mu 5 \times 100$

Test (d): the laminated sheet 1 was trimmed into a 3 cm square piece to fabricate a sample, and the relative permeability $\mu 7$ thereof at a frequency of 10 MHz was determined. Thereafter, the sample was immersed in 200 mL of Concentrate Compact CP manufactured by Atotech Japan K.K. at 80° C. for 15 minutes, and thereafter, the relative permeability $\mu 8$ of the sample at a frequency of 10 MHz was determined. By the following formula, a rate of change of the magnetic permeability before and after the immersion was determined.

Rate of Change of Magnetic Permeability (%)=$|\mu 7-\mu 8|/\mu 7 \times 100$

Test (e): the laminated sheet 1 was trimmed into a 3 cm square piece to fabricate a sample, and the relative permeability $\mu 9$ thereof at a frequency of 10 MHz was determined. Thereafter, the sample was immersed in 200 mL of Swelling Dip Securiganth P manufactured by Atotech Japan K K. at 60° C. for 5 minutes, and thereafter, the relative permeability $\mu 10$ of the sample at a frequency of 10 MHz was determined. By the following formula, a rate of change of the magnetic permeability before and after the immersion w % as determined.

Rate of Change of Magnetic Permeability (%)=$|\mu 9-\mu 10|/\mu 9 \times 100$

The relative permeability $\mu1$ to $\mu10$ described above was measured with an impedance analyzer (manufactured by Agilent, "4291B").

Each of the test (a) to test (e) was evaluated in accordance with the following criteria.

Excellent: the rate of change of the magnetic permeability before and after the immersion was 5% or less.

Bad: the rate of change of the magnetic permeability before and after the immersion was above 5%.

TABLE 1

|  | Ex. 1 | Comparative Ex. 1 |
|---|---|---|
| Slit Processability | Excellent | Bad |
| Test a | Excellent | Bad |
| Test b | Excellent | Bad |
| Test c | Excellent | Bad |
| Test d | Excellent | Bad |
| Test e | Excellent | Bad |

(Arithmetic Average Roughness Ra of One Surface of Laminated Sheet)

The arithmetic average roughness Ra of one surface of the laminated sheet 1 in Example 1 was measured. As a result, the arithmetic average roughness Ra thereof was 0.1 μm.

While the illustrative embodiments of the present invention are provided in the above description, such is for illustrative purpose only and it is not to be construed as limiting the scope of the present invention. Modification and variation of the present invention that w-ill be obvious to those skilled in the art is to be covered by the following claims.

DESCRIPTION OF SYMBOLS

1 Laminated sheet
2 Inductor
3 Processing stability layer
4 Wiring
5 Magnetic layer
6 One surface

The invention claimed is:

1. A laminated sheet comprising:
a sheet-shaped inductor including a plurality of wirings and a magnetic layer embedding the plurality of wirings, and
a processing stability layer disposed on the magnetic layer on at least one surface in a thickness direction of the inductor, wherein
the magnetic layer includes a binder, and
a magnetic particle having a generally flat shape and whose material is a metal;
the processing stability layer includes a cured product of a thermosetting resin composition; and
the thermosetting resin composition of the processing stability layer includes:
a thermosetting resin as an essential component, and
at least one particle selected from the group consisting of a first particle having a generally spherical shape whose material is an inorganic compound other than metal, and a second particle having a generally flat shape and whose material is an inorganic compound, and any combinations thereof,
wherein the laminated sheet further comprising at least one via which penetrates in a thickness direction of the processing stability layer and the magnetic layer and exposes at least one of the plurality of wirings, and which has side surfaces of the at least one via covered with the processing stability layer so as to prevent exposure of the magnetic layer.

2. The laminated sheet according to claim 1 satisfying at least one test of the following test (a) to test (e):

test (a): the laminated sheet is trimmed into a 3 cm square piece to fabricate a sample, and the relative permeability $\mu1$ thereof at a frequency of 10 MHz is determined, thereafter, the sample is immersed in 200 mL of copper sulfate plating solution containing 66 g/L of copper sulfate pentahydrate, 180 g/L of sulfuric acid concentration, 50 ppm of chlorine, and Top Lutina alpha at 25° C. for 120 minutes, and thereafter, the relative permeability $\mu2$ of the sample at a frequency of 10 MHz is determined, by the following formula, a rate of change of the magnetic permeability before and after the immersion is determined, and as a result, the rate of change of the magnetic permeability of the sample is 5% or less;

Rate of Change of Magnetic Permeability (%)=$|\mu1-\mu2|/\mu1\times100$;

test (b): the laminated sheet is trimmed into a 3 cm square piece to fabricate a sample, and the relative permeability $\mu3$ thereof at a frequency of 10 MHz is determined, thereafter, the sample is immersed in 200 mL of an acid active aqueous solution containing 55 g/L of sulfuric acid at 25° C. for 1 minute, and thereafter, the relative permeability $\mu4$ of the sample at a frequency of 10 MHz is determined, by the following formula, a rate of change of the magnetic permeability before and after the immersion is determined, and as a result, the rate of change of the magnetic permeability of the sample is 5% or less;

Rate of Change of Magnetic Permeability (%)=$|\mu3-\mu4|/\mu3\times100$;

test (c): the laminated sheet is trimmed into a 3 cm square piece to fabricate a sample, and the relative permeability $\mu5$ thereof at a frequency of 10 MHz is determined, thereafter, the sample is immersed in 200 mL of Reduction Solution Securiganth P manufactured by Atotech Japan K.K. at 45° C. for 5 minutes, and thereafter, the relative permeability $\mu6$ of the sample at a frequency of 10 MHz is determined, by the following formula, a rate of change of the magnetic permeability before and after the immersion is determined, and as a result, the rate of change of the magnetic permeability of the sample is 5% or less;

Rate of Change of Magnetic Permeability (%)=$|\mu5-\mu6|/\mu5\times100$;

test (d): the laminated sheet is trimmed into a 3 cm square piece to fabricate a sample, and the relative permeability $\mu7$ thereof at a frequency of 10 MHz is determined, thereafter, the sample is immersed in 200 mL of Concentrate Compact CP manufactured by Atotech Japan K.K. at 80° C. for 15 minutes, and thereafter, the relative permeability $\mu8$ of the sample at a frequency of 10 MHz is determined, by the following formula, a rate of change of the magnetic permeability before and after the immersion is determined, and as a result, the rate of change of the magnetic permeability of the sample is 5% or less;

Rate of Change of Magnetic Permeability (%)=$|\mu7-\mu8|/\mu7\times100$;

test (e): the laminated sheet is trimmed into a 3 cm square piece to fabricate a sample, and the relative permeability $\mu 9$ thereof at a frequency of 10 MHz is determined, thereafter, the sample is immersed in 200 mL of Swelling Dip Securiganth P manufactured by Atotech Japan K.K. at 60° C. for 5 minutes, and thereafter, the relative permeability $\mu 10$ of the sample at a frequency of 10 MHz is determined, by the following formula, a rate of change of the magnetic permeability before and after the immersion is determined, and as a result, the rate of change of the magnetic permeability of the sample is 5% or less;

Rate of Change of Magnetic Permeability (%)=|$\mu 9$−$\mu 10$|/$\mu 9$×100.

3. The laminated sheet according to claim 1, wherein the arithmetic average roughness Ra of one surface in the thickness direction of the laminated sheet is 10 μm or less.

4. The laminated sheet according to claim 2, wherein the arithmetic average roughness Ra of one surface in the thickness direction of the laminated sheet is 10 μm or less.

5. A laminated sheet comprising:
a sheet-shaped inductor including a plurality of wirings and a magnetic layer embedding the plurality of wirings, and
a processing stability layer disposed on the magnetic layer on at least one surface in a thickness direction of the inductor, wherein
the magnetic layer includes a binder, and
a magnetic particle having a generally flat shape and whose material is a metal;
the processing stability layer includes a cured product of a thermosetting resin composition; and
the thermosetting resin composition of the processing stability layer includes:
a thermosetting resin as an essential component, and
at least one particle selected from the group consisting of a first particle having a generally spherical shape whose material is an inorganic compound other than metal, and a second particle having a generally flat shape and whose material is an inorganic compound, and any combinations thereof,
wherein the laminated sheet further comprising at least one slit located between the wirings adjacent to each other when projected in the thickness direction, and
wherein the slit penetrates the processing stability layer in the thickness direction, and is formed in one surface in the thickness direction of the magnetic layer to the middle of the magnetic layer.

6. The laminated sheet according to claim 5 satisfying at least one test of the following test (a) to test (e):
test (a): the laminated sheet is trimmed into a 3 cm square piece to fabricate a sample, and the relative permeability $\mu 1$ thereof at a frequency of 10 MHz is determined, thereafter, the sample is immersed in 200 mL of copper sulfate plating solution containing 66 g/L of copper sulfate pentahydrate, 180 g/L of sulfuric acid concentration, 50 ppm of chlorine, and Top Lutina alpha at 25° C. for 120 minutes, and thereafter, the relative permeability $\mu 2$ of the sample at a frequency of 10 MHz is determined, by the following formula, a rate of change of the magnetic permeability before and after the immersion is determined, and as a result, the rate of change of the magnetic permeability of the sample is 5% or less:

Rate of Change of Magnetic Permeability (%)=|$\mu 1$−$\mu 2$|/$\mu 1$×100;

test (b): the laminated sheet is trimmed into a 3 cm square piece to fabricate a sample, and the relative permeability $\mu 3$ thereof at a frequency of 10 MHz is determined, thereafter, the sample is immersed in 200 mL of an acid active aqueous solution containing 55 g/L of sulfuric acid at 25° C. for 1 minute, and thereafter, the relative permeability $\mu 4$ of the sample at a frequency of 10 MHz is determined, by the following formula, a rate of change of the magnetic permeability before and after the immersion is determined, and as a result, the rate of change of the magnetic permeability of the sample is 5% or less:

Rate of Change of Magnetic Permeability (%)=|$\mu 3$−$\mu 4$|/$\mu 3$×100;

test (c): the laminated sheet is trimmed into a 3 cm square piece to fabricate a sample, and the relative permeability $\mu 5$ thereof at a frequency of 10 MHz is determined, thereafter, the sample is immersed in 200 mL of Reduction Solution Securiganth P manufactured by Atotech Japan K.K. at 45° C. for 5 minutes, and thereafter, the relative permeability $\mu 6$ of the sample at a frequency of 10 MHz is determined, by the following formula, a rate of change of the magnetic permeability before and after the immersion is determined, and as a result, the rate of change of the magnetic permeability of the sample is 5% or less:

Rate of Change of Magnetic Permeability (%)=|$\mu 5$−$\mu 6$|/$\mu 5$×100;

test (d): the laminated sheet is trimmed into a 3 cm square piece to fabricate a sample, and the relative permeability $\mu 7$ thereof at a frequency of 10 MHz is determined, thereafter, the sample is immersed in 200 mL of Concentrate Compact CP manufactured by Atotech Japan K.K. at 80° C. for 15 minutes, and thereafter, the relative permeability $\mu 8$ of the sample at a frequency of 10 MHz is determined, by the following formula, a rate of change of the magnetic permeability before and after the immersion is determined, and as a result, the rate of change of the magnetic permeability of the sample is 5% or less:

Rate of Change of Magnetic Permeability (%)=|$\mu 7$−$\mu 8$|/$\mu 7$×100;

test (e): the laminated sheet is trimmed into a 3 cm square piece to fabricate a sample, and the relative permeability $\mu 9$ thereof at a frequency of 10 MHz is determined, thereafter, the sample is immersed in 200 mL of Swelling Dip Securiganth P manufactured by Atotech Japan K.K. at 60° C. for 5 minutes, and thereafter, the relative permeability $\mu 10$ of the sample at a frequency of 10 MHz is determined, by the following formula, a rate of change of the magnetic permeability before and after the immersion is determined, and as a result, the rate of change of the magnetic permeability of the sample is 5% or less:

Rate of Change of Magnetic Permeability (%)=|$\mu 9$−$\mu 10$|/$\mu 9$×100.

7. The laminated sheet according to claim 5, wherein the arithmetic average roughness Ra of one surface in the thickness direction of the laminated sheet is 10 μm or less.

8. The laminated sheet according to claim 6, wherein the arithmetic average roughness Ra of one surface in the thickness direction of the laminated sheet is 10 μm or less.

9. The laminated sheet according to claim 1, further comprising an electrically conductive layer is formed in the via.

* * * * *